(12) United States Patent
Lee et al.

(10) Patent No.: US 8,531,478 B2
(45) Date of Patent: Sep. 10, 2013

(54) METHOD OF BROWSING PHOTOS BASED ON PEOPLE

(75) Inventors: Chi-Ming Lee, Taipei County (TW); Chung-Yi Weng, Taichung (TW)

(73) Assignee: CyberLink Corp., New Taipei (TW)

( * ) Notice: Subject to any disclaimer, the term of this patent is extended or adjusted under 35 U.S.C. 154(b) by 585 days.

(21) Appl. No.: 12/406,973

(22) Filed: Mar. 19, 2009

(65) Prior Publication Data

US 2010/0238191 A1 Sep. 23, 2010

(51) Int. Cl.
*G09G 5/00* (2006.01)

(52) U.S. Cl.
USPC .................... 345/619; 715/243; 382/224

(58) Field of Classification Search
USPC .................... 345/619; 715/243; 382/224
See application file for complete search history.

(56) References Cited

U.S. PATENT DOCUMENTS

| | | | |
|---|---|---|---|
| 6,792,134 B2 | 9/2004 | Chen | |
| 7,058,209 B2 | 6/2006 | Chen | |
| 7,120,279 B2 | 10/2006 | Chen | |
| 7,403,642 B2 | 7/2008 | Zhang et al. | |
| 7,835,541 B2 | 11/2010 | Lee | |
| 8,014,572 B2 | 9/2011 | Xiao | |
| 8,031,914 B2 | 10/2011 | Zhang | |
| 8,036,432 B2 | 10/2011 | Kim | |
| 2002/0103813 A1 | 8/2002 | Frigon | |
| 2003/0001879 A1 | 1/2003 | Lin et al. | |
| 2003/0210808 A1 | 11/2003 | Chen | |
| 2003/0227468 A1* | 12/2003 | Takeda .................. | 345/619 |
| 2004/0120554 A1 | 6/2004 | Lin | |
| 2004/0151371 A1 | 8/2004 | Chen | |
| 2005/0105780 A1 | 5/2005 | Ioffe | |
| 2005/0105806 A1 | 5/2005 | Nagaoka et al. | |
| 2006/0056737 A1 | 3/2006 | Ohtsuka et al. | |
| 2006/0251292 A1 | 11/2006 | Gokturk et al. | |
| 2007/0186189 A1* | 8/2007 | Schiller ................... | 715/838 |
| 2007/0206844 A1 | 9/2007 | Russakoff | |
| 2007/0237364 A1 | 10/2007 | Song et al. | |
| 2007/0296863 A1 | 12/2007 | Hwang | |
| 2008/0166027 A1 | 7/2008 | Jeong | |
| 2008/0298766 A1* | 12/2008 | Wen et al. ................ | 386/46 |
| 2008/0304755 A1 | 12/2008 | Xiao | |
| 2009/0316962 A1 | 12/2009 | Sun | |
| 2010/0226584 A1 | 9/2010 | Weng | |

FOREIGN PATENT DOCUMENTS

| | | |
|---|---|---|
| JP | 2002169810 A | 6/2002 |
| JP | 200549968 A | 2/2005 |
| JP | 2005148900 A | 6/2005 |
| JP | 2006318034 A | 11/2006 |
| JP | 2008217335 A | 9/2008 |
| WO | 2007117448 A2 | 10/2007 |

OTHER PUBLICATIONS

Weng, Chung-Yi, "Method of Grouping Images by Face", U.S. Appl. No. 12/399,018, Mar. 6, 2009.

* cited by examiner

*Primary Examiner* — Michelle L Sams
(74) *Attorney, Agent, or Firm* — Winston Hsu; Scott Margo (57) ABSTRACT

To browse images grouped by person on a photo displaying system, a plurality of facial regions are generated from a plurality of images of a plurality of albums. The facial regions are grouped into a plurality of clusters of faces based on similarity between the facial regions. The clusters of faces are associated with the albums. A signal is received to select one of the facial regions. The selected facial region belongs to a specific cluster of faces and the specific cluster of faces is associated with a specific album of the albums. Images of the specific album and facial regions of the clusters of faces are displayed.

31 Claims, 10 Drawing Sheets

| Facial region | Image (index) | Album (path) | Cluster |
|---|---|---|---|
| 401 | 402 | Travel in Italy | Person B |
| 406 | 403 | Travel in Japan | Person B |
| ⋮ | ⋮ | Travel in Italy | Person A |
| ⋮ | ⋮ | Travel in Japan | Person D |
| ⋮ | ⋮ | ⋮ | ⋮ |

METHOD OF BROWSING PHOTOS BASED ON PEOPLE

CROSS-REFERENCE TO RELATED PATENT APPLICATIONS

This application is related to co-pending U.S. patent application Ser. No. 12/399,018 by Chung-Yi Weng, Wei-Ting Tsai, and Chi-Ming Lee entitled "Method of Grouping Images by Face", filed Mar. 6, 2009 with the same assignee as the present disclosure. The disclosure of the above-identified co-pending application is incorporated in its entirety herein by reference.

BACKGROUND OF THE INVENTION

1. Field of the Invention

The present invention relates to methods for organizing and browsing images, and more particularly, to a method of browsing photos based on people.

2. Description of the Prior Art

Digital photography has revolutionized both professional and consumer photography. Elimination of physical film in digital cameras makes photography more cost effective by reducing film and photo development costs. Further, hundreds or thousands of digital images captured by the digital camera may be stored in a single flash memory card, such as a CompactFlash (CF) card, a Secure Digital (SD) card, or a Memory Stick (MS) device. Thus, digital photography has increased the number of people taking digital pictures, and also increased the number of pictures taken by each person, leading to a massive increase in the number of digital images generated by users.

One problem presented by the number of digital images being generated is organization of the images in a way that allows a user to find a particular photo rapidly. Typically, the user must spend minutes to find the photo, or may not be able to find the photo at all. At best, the user may be able to sort the photos by date, or by tag if the user has manually entered tags for each photo. However, if the user does not know the date the photo was taken on, or if the user has not tagged the photo, these methods may not lead to the user successfully finding the photo. Clearly, the interfaces and organizing/browsing methods utilized for finding digital images in computing systems are not intuitive, and require tremendous effort on the part of users.

SUMMARY OF THE INVENTION

According to one embodiment, a method of browsing images grouped by person on a photo displaying system comprises generating a plurality of facial regions from a plurality of images of a plurality of albums, grouping the facial regions into a plurality of clusters of faces based on similarity between the facial regions, associating the clusters of faces with the albums, and receiving a signal to select one of the facial regions. The selected facial region belongs to a specific cluster of faces and the specific cluster of faces is associated with a specific album of the albums. The method further comprises displaying images of the specific album and facial regions of the clusters of faces.

According to the above embodiment, an electronic device for browsing images grouped by person comprises a display, a storage module, and a processor. The storage module stores an album comprising a plurality of images. The input device is for selecting a first facial region of a plurality of facial regions. The processor is for generating the plurality of facial regions from the images, grouping the facial regions into a cluster of faces based on similarity between the facial regions, associating the cluster of faces with the album, and controlling the display to display the images of the album and the facial regions of the cluster of faces.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
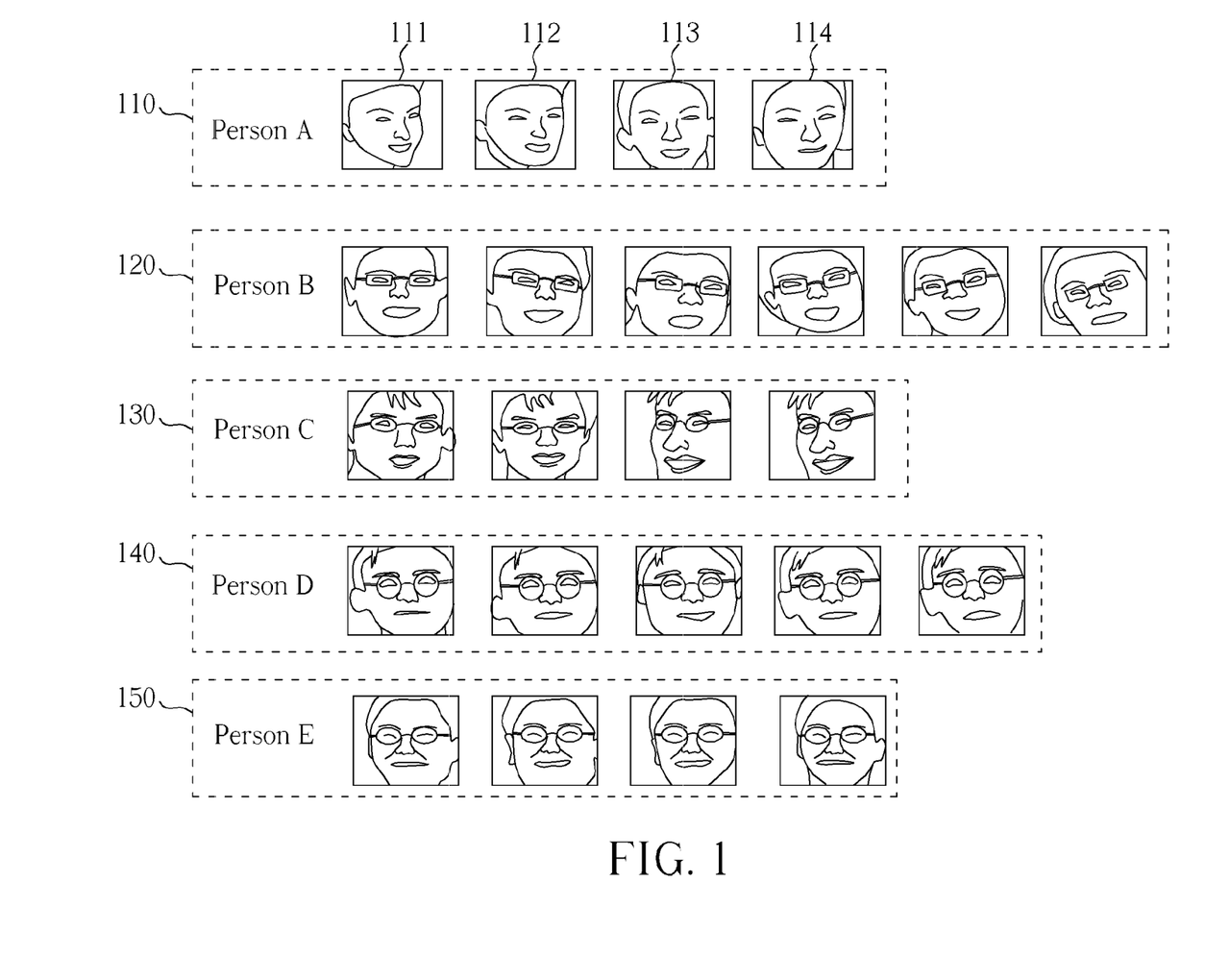
FIG. 1 is a diagram of a plurality of digital image thumbnails organized by person according to an embodiment of the present invention.

Please refer to FIG. 1, which is a diagram of a plurality of digital image thumbnails organized by person. Please also refer to FIG. 5, which is a flow chart of a method for browsing images grouped by person. The method of browsing digital images takes people appearing in digital images as a basis for browsing, and uses people grouping technology and its results to help users browse the digital images. Embodiments of the method are suitable for use in any type of photo displaying system, including but not limited to a laptop, a mobile phone, a digital camera, a digital photo frame, etc. First, facial regions are generated from the digital images (Step 500). The images may belong to a plurality of albums. In other words, each album may contain one or more of the images. The albums may be user-defined or automatically defined. User-defined albums may be generated by a user establishing an album and moving or copying images into the album. Or, the user may tag images with a tag corresponding to the album. Automatic establishment of an album could be performed by photo displaying software of the photo displaying system, and may include establishing an album by date, by month, by year, by person, etc.

Figure 5:
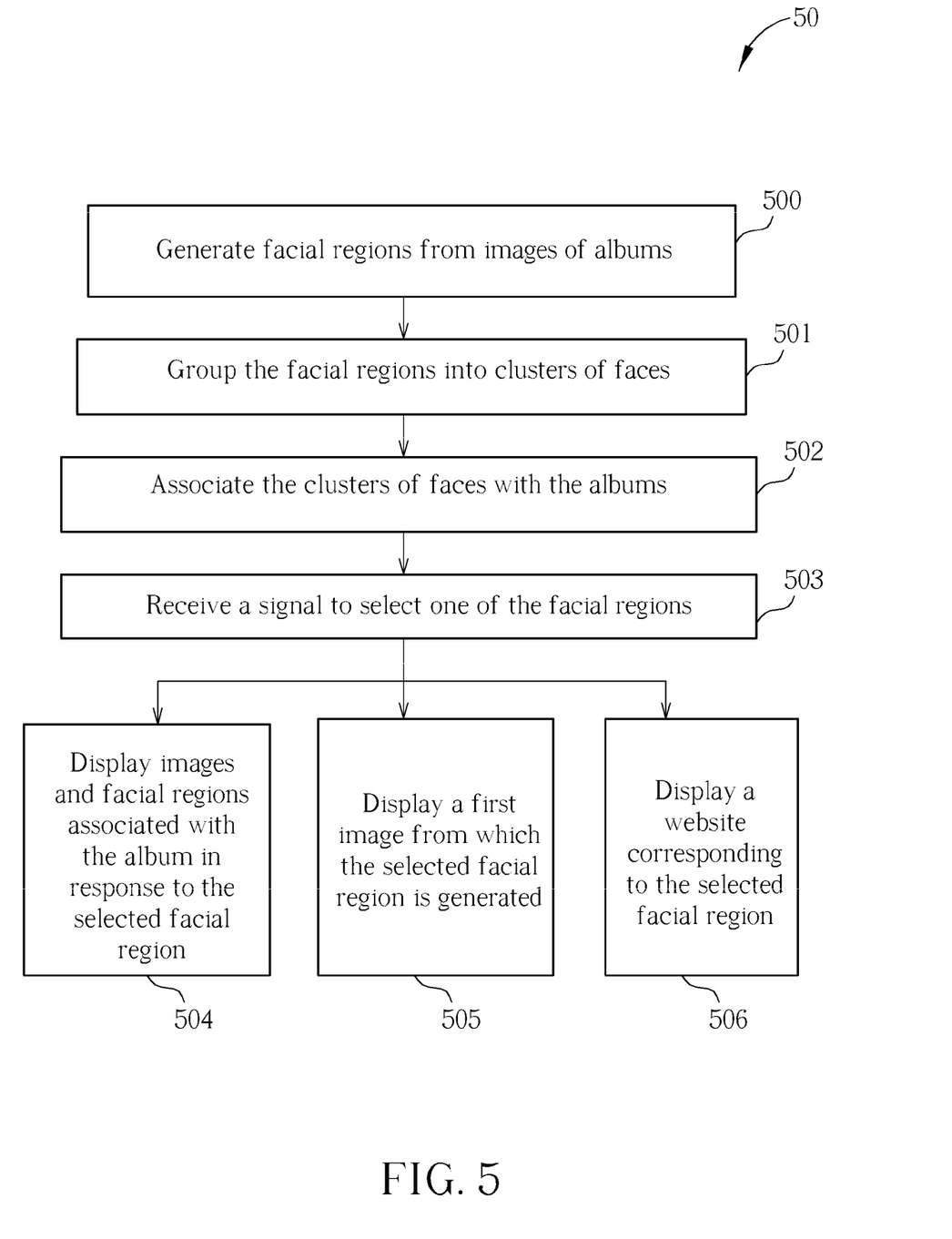
FIG. 5 is a flow chart of a method for browsing images grouped by person according to the above embodiment.

Many different embodiments are available for a system to find the facial regions smoothly. For example, an edge detector may be utilized for finding locations of edges appearing in the digital images. Then, the edges found may be compared with an outline near the facial region to find the position of the facial region. Another method for detecting the facial region may search for facial features, such as eyes, nose, and mouth, in the digital image. Then, the relative positions of the facial features may be utilized as a condition for filtering out regions of the image that cannot be part of the facial region, so as to determine the position of the facial region. Finally, another method for detecting the facial region in the image may initially store a large number of facial data of all kinds of different people, and train a model based on relationships between pixels of each face in the facial data. Then, the model may be used to detect regions in the image matching conditions of the model, so as to obtain the facial region or facial regions in the image. After detecting the facial region, the image may be cropped to isolate the facial region for use in grouping at a later time. Cropping may be performed according to user input, e.g. through dragging of a mouse. Alignment may be performed on the facial regions cropped from the images, so that eyes, noses, and mouths, etc. of multiple face images may be lined up into similar relative locations in each cropped image. For example, the facial region will be rotated and/or resized to match a face image template. In one embodiment of the current invention, the alignment will be performed by adjusting the facial region based on the relative locations of the facial features in the cropped image.

Figure 6:
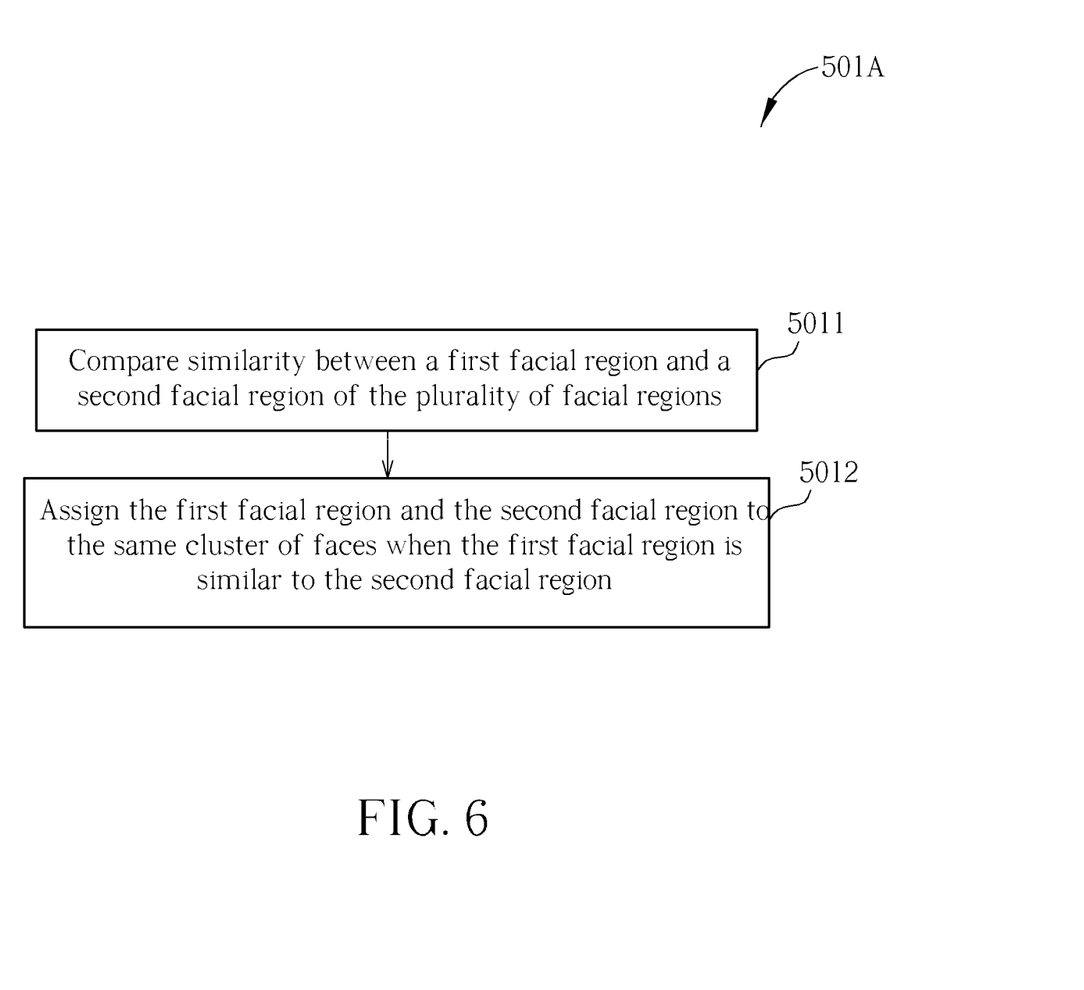
FIG. 6 is a flow chart of a first embodiment of grouping the facial regions into clusters of faces.
Figure 7:
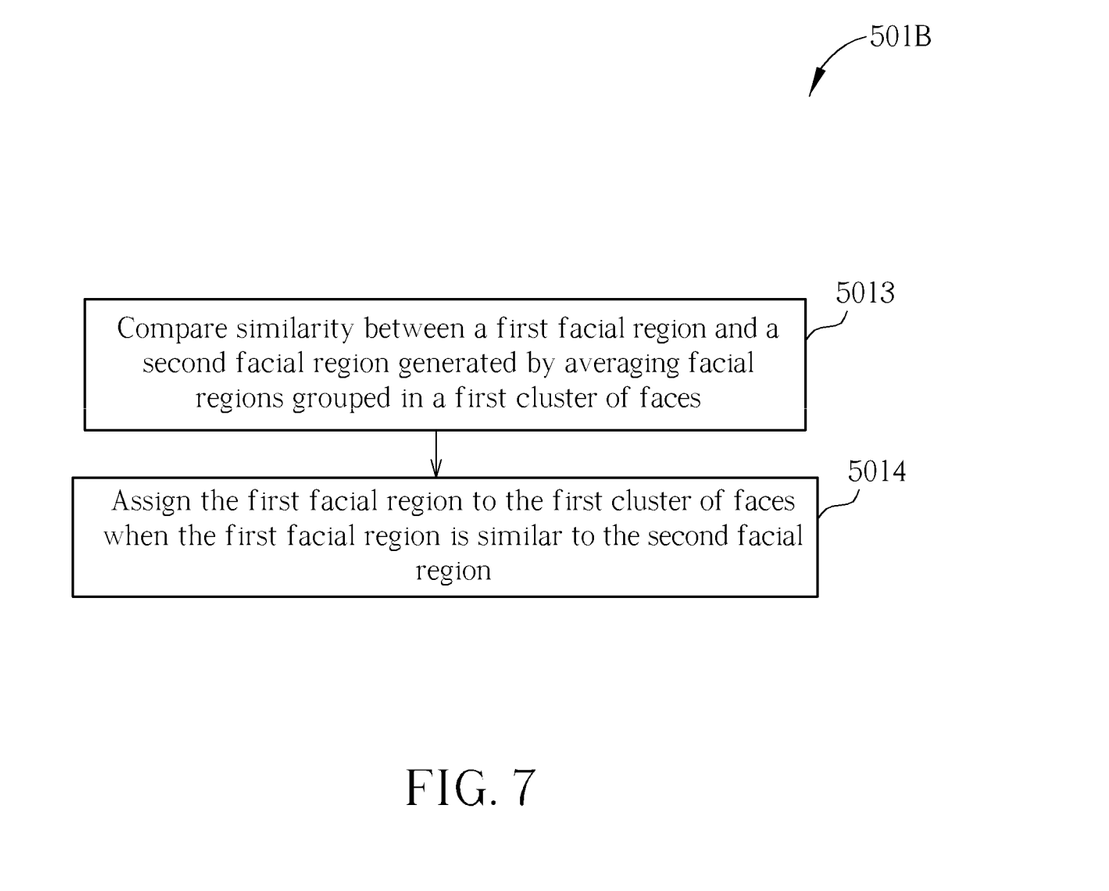
FIG. 7 is a flow chart of a second embodiment of grouping the facial regions into clusters of faces.

In Step 501 in FIG. 5, the facial regions are grouped into a plurality of clusters of faces based on similarity between the facial regions. The clusters of faces shown in FIG. 1 are an example of a result of executing Step 501. To group the facial regions into clusters of faces, feature values of each facial region may be extracted. Then, the feature values may be expressed as characteristic vectors. The characteristic vectors may be compared for similarity. Examples of such characteristic vectors include, but are not limited to, distance between eyes, width of nose, depth of eye sockets, shape of cheekbones, and length of jaw line. Similar faces determined from comparing the characteristic vectors may then be combined into clusters of faces to complete the face grouping (Step 501). In one embodiment (Step 501A) of Step 501 shown in FIG. 6, grouping may be accomplished by comparing similarity between a first facial region of the plurality of facial regions and a second facial region of the plurality of facial regions (Step 5011). Then, the first facial region and the second facial region may be assigned to the same cluster of faces when the first facial region is similar to the second facial region (Step 5012). In another embodiment (Step 501B) of Step 501 shown in FIG. 7, a first facial region of the plurality of facial regions may be compared with a second facial region generated by averaging facial regions grouped into a first cluster of faces (Step 5013). The average facial region would be obtained by averaging the feature values of each image of the first cluster of faces. If the first facial region is similar with the facial region average of the first cluster of faces, the first facial region may be assigned to the first cluster of faces (Step 5014).

FIG. 1 shows a result of performing face grouping on a plurality of images to generate the clusters of faces. As shown in FIG. 1, a plurality of clusters of faces 110, 120, 130, 140, 150 correspond to a plurality of people (Persons A-E) in the plurality of images. Each cluster of faces may comprise a plurality of facial regions. Because the facial regions may be generated from images having different resolutions, and each facial region may take up more or less area of the image, the facial regions generated my initially have very different areas. Thus, facial regions with larger area may be shrunk into face thumbnails for display and processing. For example, the cluster 110 corresponding to Person A may comprise four thumbnails 111, 112, 113, 114 corresponding to a plurality of images in which Person A appears. Each thumbnail may be linked to a corresponding image containing the facial region from which the thumbnail was generated.

Figure 8:
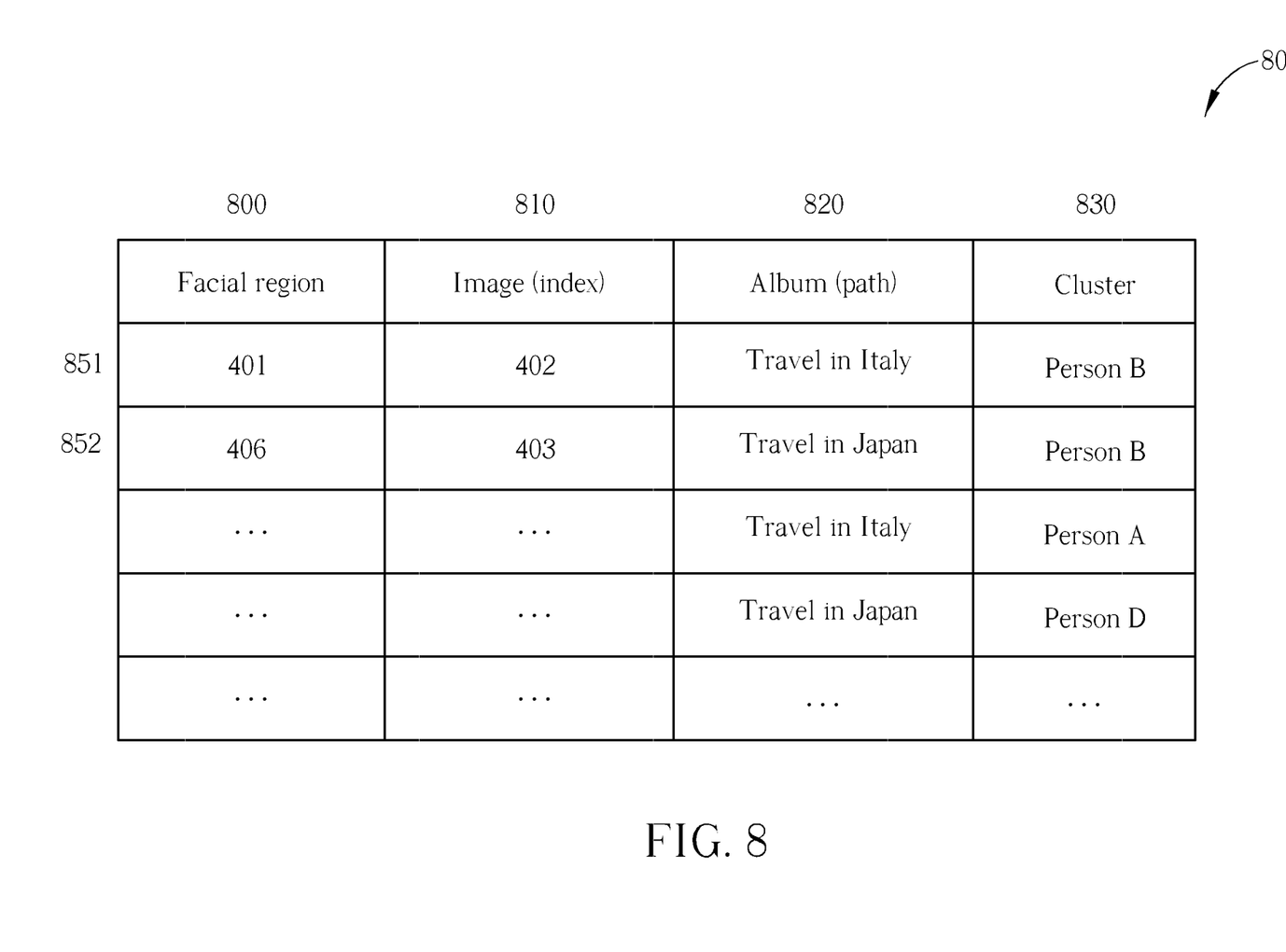
FIG. 8 is a diagram illustrating a table for linking the facial region, the image the facial region is generated from, and the album storing the image.

Once the facial regions are grouped into the clusters of faces, the clusters of faces may be associated with the albums (Step 502). In one embodiment, the facial regions, face thumbnails, clusters, people, and images may be stored and linked together in a database. A table 80 shown in FIG. 8 is one example illustrating one embodiment of linking the facial regions, the images, the albums, and the clusters in the database. Creation of the table 80 to link the facial regions, the images, and the albums may be considered in the generating step (Step 500). As shown in FIG. 8, a facial region field 800 may store information about the facial region, an image (index) field 810 may store an identifier corresponding to the image that the facial region belongs to, an album (path) field 820 may store information about the album that the image belongs to, and a cluster field 830 may store information about which person the facial region corresponds to. The facial region field 800 may store image data of the facial region, a facial region index unique to the facial region, or a location of the facial region. The image field 810 may store image data of the image, an image index unique to the image, or a location of the image, e.g. a file name and path of the image. The album field 820 may store a path that the images of the album are stored in, an album index unique to the album, a link mapping to multiple folders, or a tag used for labeling the images of the album. The link mapping to multiple folders may include a path to local storage, a Uniform Resource Locator (URL) to a website, and etc. The cluster field 830 may store name of a person displayed by facial regions of the cluster of faces, or a cluster index unique to the cluster of faces. In other words, an album may be associated with any cluster of faces containing a facial region generated from an image belonging to the album. An album may be associated with one cluster of faces, multiple clusters of faces, or no clusters of faces, depending on how many, if any, unique people appear in images belonging to the album. In this way, a cluster of faces of the plurality of clusters of faces is associated with an album of the plurality of albums when the cluster of faces comprises a facial region of the plurality of facial regions generated from an image of the plurality of images of the album. In the embodiment, the data filled into the facial region field 800, the image field 810 and the album field 820 are obtained in the execution of Step 500. Likewise, the data filled into the cluster field 830 is obtained in the execution of Step 502. The associating step (Step 502) may include recording a linkage between the facial regions and the cluster of faces into the table 80.

Figure 2:
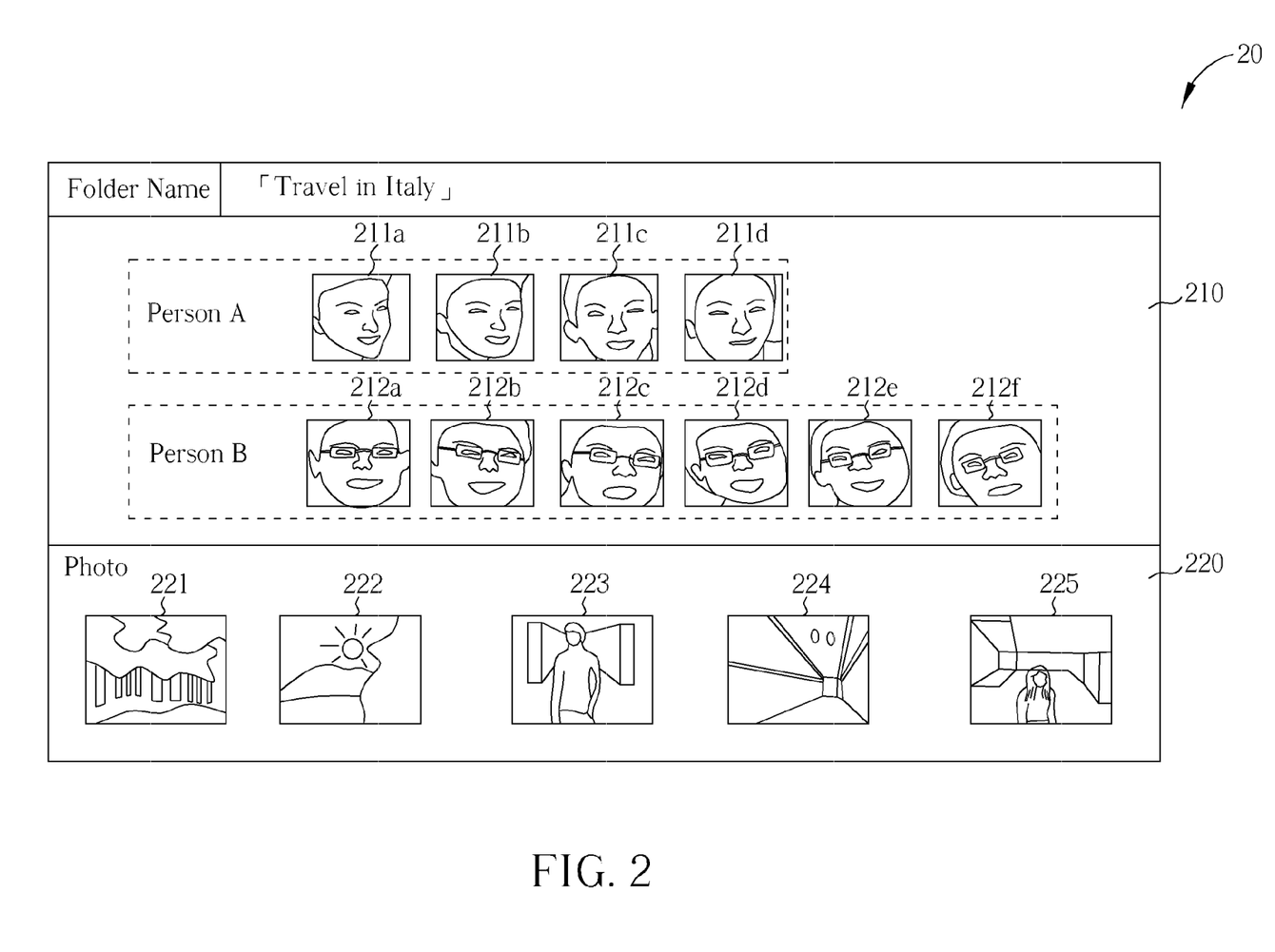
FIG. 2 is an illustrative diagram of browsing images grouped by person according to the above embodiment.

Continuing with FIG. 5, please refer to FIG. 2, which is an illustrative diagram of browsing images grouped by person as described above. Based on the grouping and associating results obtained in Step 501 and Step 502, a user may open a browser window 20 of a browser to browse a folder corresponding to one of the albums. The browser window 20 may display images in which a plurality of people appear. As shown in FIG. 2, for example, the user may select a folder named "Travel in Italy," which may have images in which a first person (Person A) and a second person (Person B) appear. In a people frame 210 of the browser window 20, a plurality of facial regions 211a-211d corresponding to the cluster of faces for Person A and a plurality of facial regions 212a-212f corresponding to a cluster of faces for Person B are displayed. A photo frame 220 may show full thumbnails 221-225 of each image of the folder. The facial regions 211a-211d, 212a-212f may include facial regions corresponding to the images of the folder browsed in the browser window 20, as well as facial regions corresponding to images from other folders. In other words, when browsing a particular folder, such as the folder shown in the browser window 20, the method may initially determine which people appear in images of the folder, then display clusters corresponding to the people. Because each cluster may be established across a large number of photos belonging to a large number of folders, the facial regions in each cluster are not limited to the images of the folder currently browsed.

Figure 3:
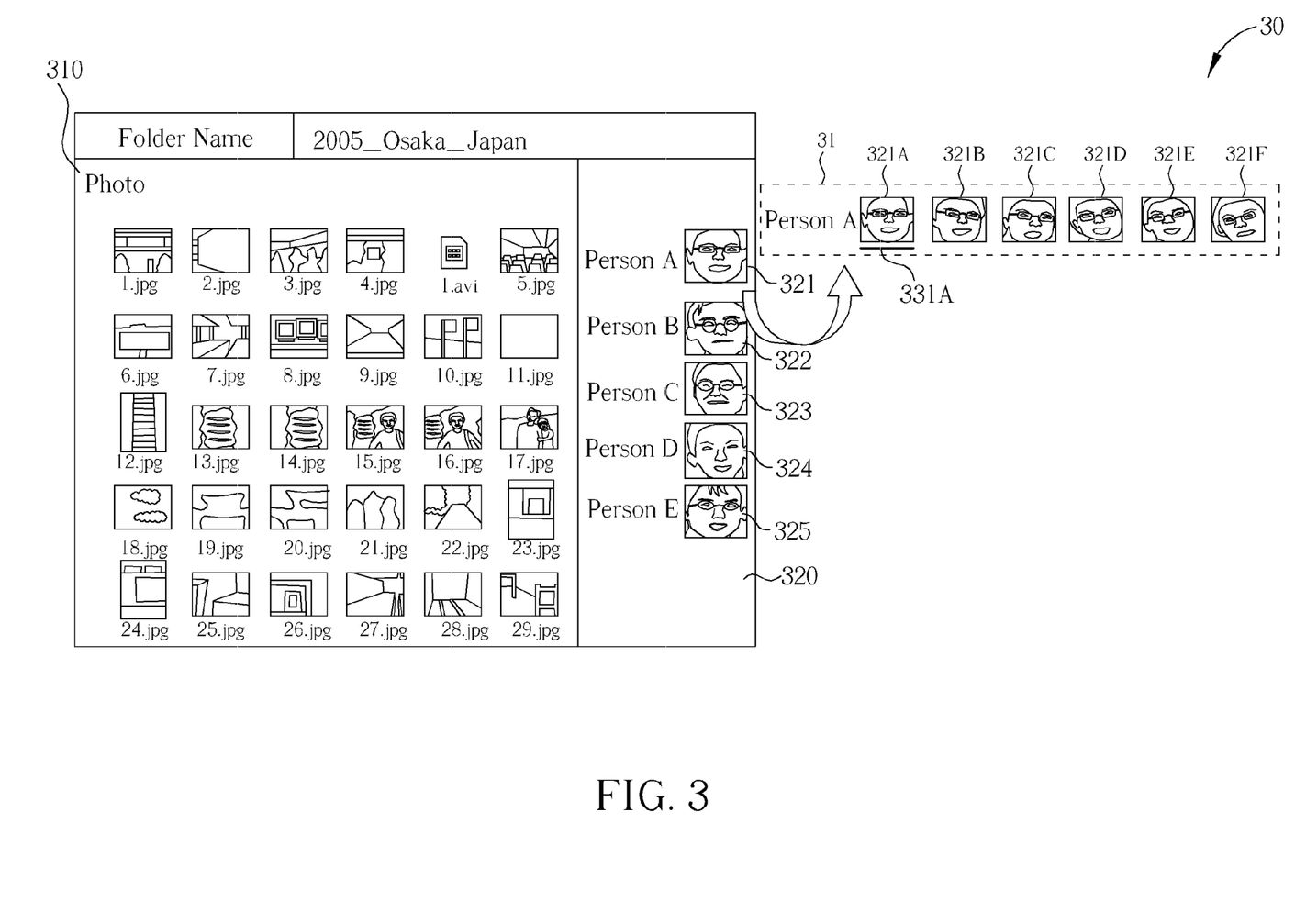
FIG. 3 is another diagram illustrating browsing images grouped by person according to the above embodiment.
Figure 10:
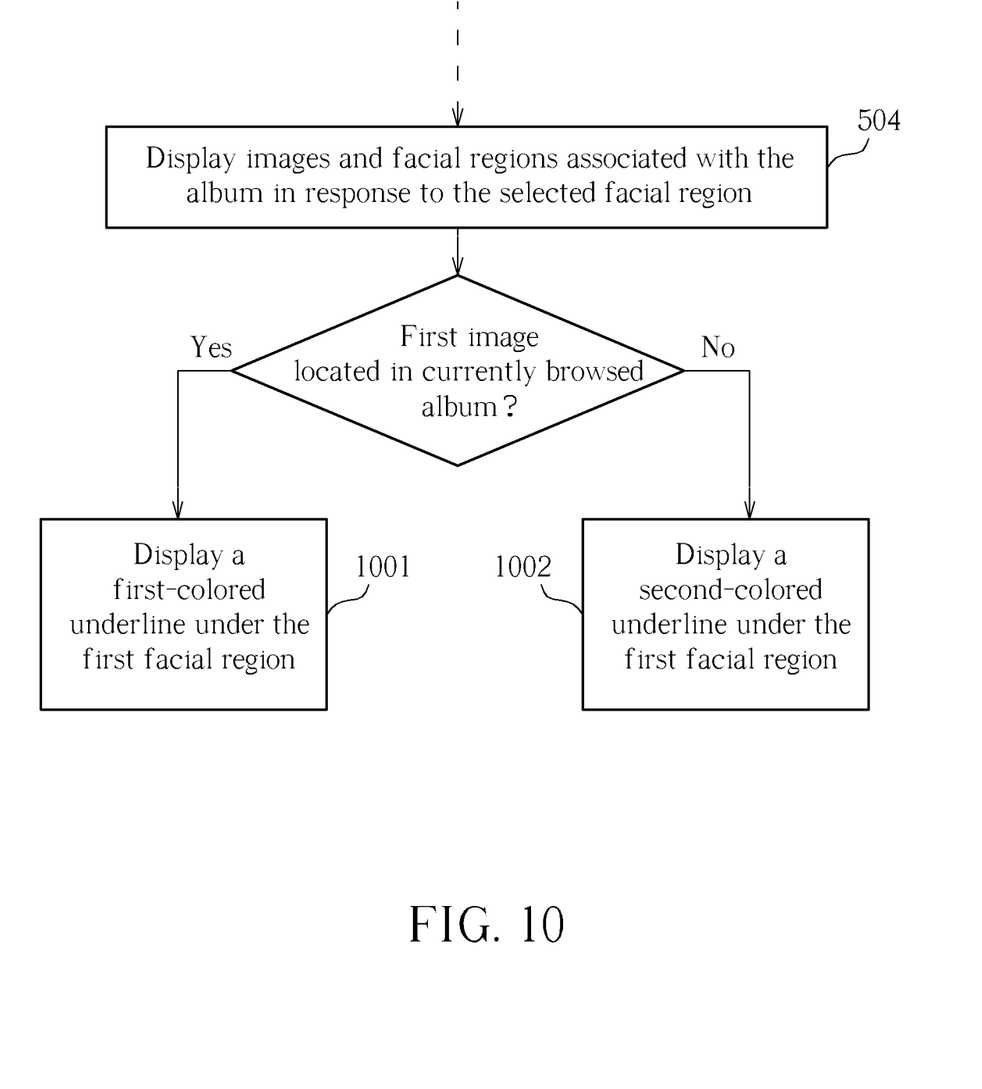
FIG. 10 is a flow chart of an embodiment of modifying display of the facial regions during browsing.

Please refer to FIG. 3, which is a diagram illustrating another browsing method for images grouped by person as described above. In FIG. 3, a user may use a browser window 30 to browse a folder named "2005_Osaka_Japan" corresponding to one of the albums. In the browsing method shown in FIG. 3, thumbnails of images of the album may be displayed in a photo frame 310 of the browser window 30, and clusters of faces represented by facial regions 321, 322, 323, 324, 325 corresponding to people appearing in the images may be displayed in a "People" frame 320. Initially, instead of displaying multiple facial regions corresponding to each person, the representative facial regions 321-325 may be displayed for each person in the people frame 320. Then, if the user selects one of the representative facial regions 321-325, e.g. the facial region 321, corresponding to one of the people in the people frame 320 (the facial region 321 corresponds to Person A), a plurality of facial regions 321A-321F corresponding to the selected person may be displayed, e.g. in a popup window 31. As shown in FIG. 3, because the facial regions 321A-321F may correspond to images in the album browsed in the browser window 30 or to images in another album or albums, a folder identifier may be displayed with each facial region 321A-321F to alert the user to whether each image may be found in the current folder, e.g. the folder browsed in the browser window 30, or in another folder. For example, as shown in FIG. 3 and FIG. 10, an underline 331A may be displayed below the facial region 321A to indicate that an image corresponding to the facial region 321A may be found in the currently browsed folder (Step 1001). Differently colored and/or differently weighted underlines may be utilized to distinguish between the facial regions. Images in common folders may be represented by one color or weighting of underline. Or, all images in the current folder may be represented by one color or weighting of underline (Step 1001), and all images not in the current folder may be represented by another color or weighting of underline (Step 1002). There are various embodiments for distinguishing between the facial regions without leaving the teaching of the current invention. For example, the background colors of the facial regions are changed for different clusters of faces, the colors of underlines added under the facial regions are varied with different clusters of faces, and a colored frame surrounding the facial region is added to emphasize the specific facial regions in response to the clusters of faces.

Figure 4:
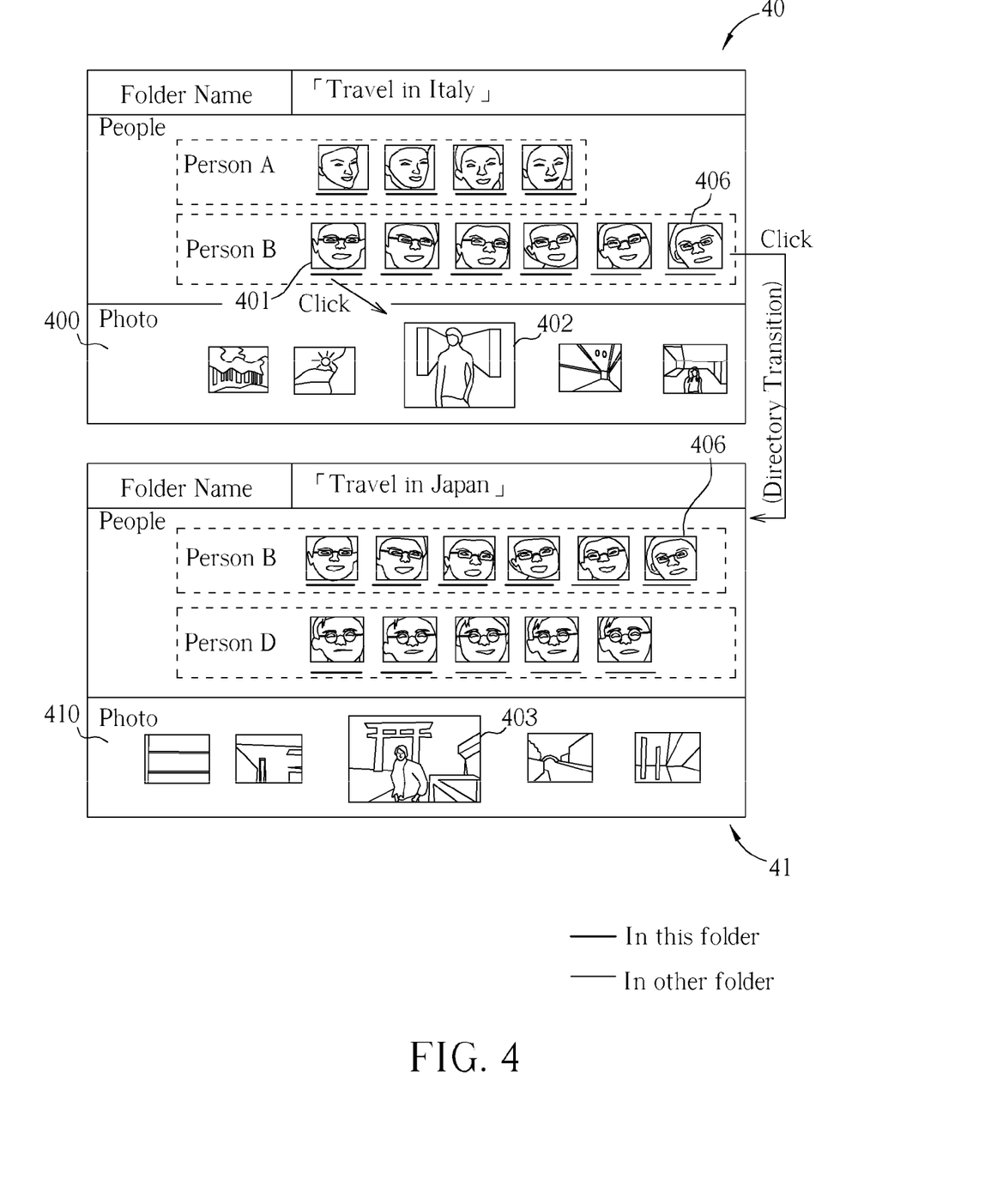
FIG. 4 is a third diagram illustrating browsing utilizing the people grouping of the above embodiment.

Please refer to FIG. 4 in conjunction with FIG. 5 and FIG. 8. FIG. 4 is a diagram illustrating a third browsing embodiment utilizing the people grouping described above. In FIG. 4, starting with a browser window 40 for browsing a first folder, a user may select a facial region 401 corresponding to Person B (Step 503). A signal may be received to select one of the facial regions. The selected facial region may belong to a specific cluster of faces and the specific cluster of faces may be associated with a specific album of the albums. Then, if the facial region 401 corresponds to an image located in the folder browsed in the browser window 40, an image 402 corresponding to the facial region 401 may be displayed in a central location of the photo frame 400, and facial regions associated with the album may be displayed in the people frame in response to the selected facial region (Step 504). As shown in FIG. 8, a first row 851 of the table 80 may link information about the facial region 401, an identifier corresponding to the image 402, information about the album "Travel in Italy," and information about the cluster for Person B. In another embodiment, the image 402 may be displayed as an enlarged thumbnail of the image 402 in response to selection of the facial region 401 in Step 505. The enlarged thumbnail may be a shrunken version of the image 402, an enlarged version of the image 402, or the image 402 in its entirety. In other words, when the user selects the facial region 401, the image 402 containing the facial region 401 may be displayed in its actual size, a reduced size, or an enlarged size. The image 402 may be shrunk or enlarged to a predetermined size, 200 pixels by 150 pixels predetermined by the user or the programmer for example. If a facial region 406 corresponding to an image 403 not located in the first folder is selected, when the user selects the facial region 406, a second browser window 41 may be opened for browsing a second folder in which the image 403 corresponding to the facial region 406 is located. Or, the browser window 40 may be updated to browse the second folder, instead of opening the second browser window 41. Then, an enlarged thumbnail of the image 403 may be displayed in a central location of a photo frame 410 of the second browser window 41. As shown in FIG. 8, a second row 852 may link information about the facial region 406, an identifier corresponding to the image 403, information about the album "Travel in Japan," and information about the cluster for Person B. As shown in FIG. 4, the album "Travel in Italy" may be associated with Person A and Person B, whereas the album "Travel in Japan" may be associated with Person B and Person D.

In the above, when the user selects the facial region 406 not located in the first folder, the method may also simply continue utilizing the browser window 40 for browsing contents of the second folder, without a need for opening the second browser window 41. It is also worthy of note that although the browser window 40 or the second browser window 41 may be opened to browse the album associated with the facial region 406, in another embodiment, the photo displaying system may also browse to a related space associated with the facial region 406, other than the album "Travel in Japan," when the user selects a facial region. For example, the related space may be a website corresponding to the person whose face appears in the facial region of the image. In an embodiment, the website corresponding to the selected facial region is displayed in Step 506.

In the above, the user may also label each facial region with a name. For example, a first facial region may be labeled with a first name, and a second facial region may be labeled with a second name. Then, the grouping step (Step 501) may be performed when the first name of the first facial region matches the second name of the second facial region. In other words, the first facial region may be grouped together with the second facial region when the first name matches the second name.

Figure 9:
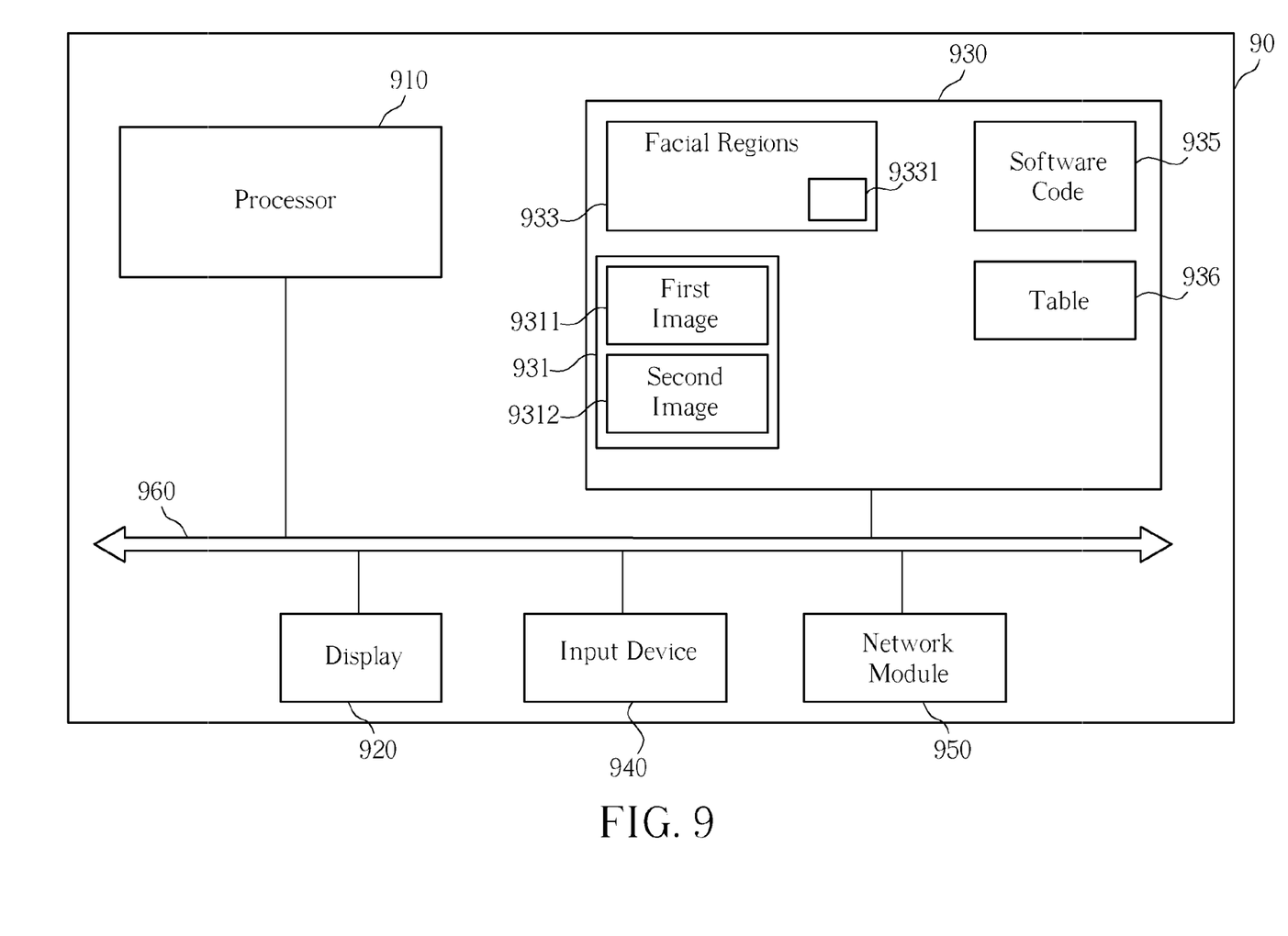
FIG. 9 is a diagram of an electronic device for browsing images grouped by person according to the above embodiments.

Please refer to FIG. 9, which is a diagram of an electronic device 90 for browsing images according to the above embodiment. The electronic device 90 may be any type of photo displaying system, including but not limited to a laptop, a mobile phone, a digital camera, a digital photo frame, etc. In this embodiment, the method is implemented as software code 935 in cooperation with a computing platform. The computing platform comprises a processor 910, a display 920, a storage module 930, an input device 940, a network module 950 and a bus 960 for commands transmission and/or data transmission between any two of the components. The processor 910 would be a custom-made or commerciallyavailable processor, a central processing unit (CPU), an auxiliary processor among several processors, a semiconductor based microprocessor (in the form of a microchip or chip set), a macroprocessor, and/or generally any device for executing software instructions. The storage module 930 would be any one of a combination of volatile memory elements (e.g. random-access memory (RAM), such as DRAM, and SRAM, etc.) and/or nonvolatile memory elements (e.g. read-only memory (ROM), hard drive, tape, etc.). The software code 935 is stored in the storage module 930 and will be executed by the processor 910 to perform the disclosed methods of the current invention. Furthermore, the storage module 930 stores the software code 935 with the grouping method and other above-mentioned methods, and an album 931 comprising a first image 9311, and a second image 9312. The storage module 930 also stores a plurality of facial regions 933 and a table 936. More particularly, the software code 935 comprises the method for generating the first facial region 9331 from the first image 9311, the method for grouping the first facial region 9331 into the cluster of faces based on similarity between the first facial region 9331 and a second facial region generated from the second image 9312, and the browsing instructions to display the plurality of facial regions 933 in a browser window in the display 920. The grouping results will be stored in the table 936, such that the table 936 stores the associations between the cluster of the faces and images, and the associations between the cluster of faces and other fields disclosed in the table 80 of FIG. 8. Besides, the table 936 may comprise a link field to define the related space corresponding to the person, such as the blog of the person. The network module 950 is for transmitting data of the related space received through a network to the processor 910. In another embodiment, the methods disclosed in the current invention could be implemented as a logic module within an FPGA (Field-Programmable Gate Array), ASIC (Application-specific integrated circuit), or any hardware component with digital logic circuits based on semiconductor technologies.

The embodiments of the present invention increase convenience for the user by providing intuitive browsing methods and a related electronic device which display the facial regions corresponding to the people who appear in the images being browsed, and provide a convenient way for accessing related spaces through selection of the facial region.

Those skilled in the art will readily observe that numerous modifications and alterations of the device and method may be made while retaining the teachings of the invention.

What is claimed is:

1. A method of browsing images grouped by person on a photo displaying system having a processor, the method comprising:
generating, using the processor, a plurality of facial regions from a plurality of images of a plurality of albums;
grouping, using the processor, the facial regions into a plurality of clusters of faces based on similarity between the facial regions;
associating, using the processor, the clusters of faces with the albums;
receiving a signal to select one of the facial regions, wherein the selected facial region belongs to a specific cluster of faces and the specific cluster of faces is associated with a specific album of the albums; and
displaying, using the processor, images of the specific album and facial regions of the clusters of faces, wherein the step of displaying further comprises:
displaying a browser window at least including a photo frame and a people frame;
displaying all images of the specific album in the photo frame of the browser window; and
displaying the facial regions of the clusters of faces associated with the specific album in the people frame of the browser window;
wherein the browser window, the photo frame and the people frame are displayed at the same time.

2. The method of claim 1, further comprising:
receiving the signal from a user selecting one of the facial regions; and
displaying the images of the specific album and facial regions of the clusters of faces in response to reception of the signal.

3. The method of claim 1, wherein the grouping step is performed when a characteristic vector of a first facial region of the plurality of facial regions is similar to a characteristic vector of a second facial region of the plurality of facial regions.

4. The method of claim 1, further comprising:
labeling a first facial region of the plurality of facial regions with a first name; and
labeling a second facial region of the plurality of facial regions with a second name.

5. The method of claim 4, wherein the grouping step is performed when the first name of the first facial region matches the second name of the second facial region.

6. The method of claim 1, wherein the grouping step comprises:
comparing similarity between a first facial region of the plurality of facial regions and a second facial region of the plurality of facial regions; and
assigning the first facial region and the second facial region to the same cluster of faces when the first facial region is similar to the second facial region.

7. The method of claim 1, wherein the grouping step comprises:
comparing similarity between a first facial region of the plurality of facial regions and a second facial region, wherein the second facial region is generated by averaging facial regions grouped in a first cluster of faces; and
assigning the first facial region to the first cluster of faces when the first facial region is similar to the second facial region.

8. The method of claim 1, wherein the facial region is generated by cropping from the image.

9. The method of claim 8, wherein the facial region is cropped according to user input.

10. The method of claim 1, wherein a cluster of faces of the plurality of clusters of faces is associated with an album of the plurality of albums when the cluster of faces comprises a facial region of the plurality of facial regions generated from an image of the plurality of images of the album.

11. The method of claim 1, wherein the generating step is creating a table linking the facial regions, the images, and the albums.

12. The method of claim 11, wherein the associating step is recording a linkage between the facial regions and the cluster of faces into the table.

13. The method of claim 1 further comprising displaying a first image, wherein the selected facial region is generated from the first image.

14. The method of claim 1, wherein displaying the clusters of faces is displaying representative facial regions of the clusters of faces.

15. The method of claim 1 further comprising displaying a website corresponding to the selected facial region.

16. The method of claim 1, further comprising:
modifying display of a first facial region when the first facial region is generated from a first image and the first image is located in an album currently browsed in the browser window.

17. The method of claim 16, wherein modifying the display of the first facial region comprises at least one of:
changing a background color of the facial region;
adding an underline under the facial region; and
adding a colored frame surrounding the facial region.

18. The method of claim 1, further comprising:
modifying display of a first facial region when the first facial region is generated from a first image and the first image is not located in an album currently browsed in the browser window.

19. An electronic device for browsing images grouped by person, the electronic device comprising:
a display;
a storage module storing an album comprising a plurality of images of a plurality of albums, and a plurality of software codes;
an input device for selecting a first facial region of a plurality of facial regions; and
a processor executing the software codes stored in the storage module, wherein the software codes comprise:
a software code for generating the plurality of facial regions from the plurality of images of the plurality of albums;
a software code for grouping the facial regions into a plurality of clusters of faces based on similarity between the facial regions;
a software code for associating the cluster of faces with the albums;
a software code for selecting, via the input device, one of the facial regions, wherein the selected facial region belongs to a specific cluster of faces and the specific cluster of faces is associated with a specific album of the albums; and
a software code for controlling the display to display images of the specific album and the facial regions of the cluster of faces, wherein the step of displaying further comprises:
displaying a browser window at least including a photo frame and a people frame;
displaying all images of the specific album in the photo frame of the browser window; and
displaying the facial regions of the clusters of faces associated with the specific album in the people frame of the browser window;
wherein the browser window, the photo frame and the people frame are displayed at the same time.

20. The electronic device of claim 19, wherein the storage module further stores a table linking the plurality of facial regions, the plurality of images, and the album.

21. The electronic device of claim 20, wherein the table further links the facial regions and the cluster of faces.

22. The electronic device of claim 19, further comprising:
a network module for transmitting data of a related space received through a network to the processor.

23. The electronic device of claim 19, wherein the software codes further comprise a software code for determining the similarity between the first facial region and a second facial region based on a characteristic vector of the first facial region and a characteristic vector of the second facial region.

24. The electronic device of claim 19, wherein the software codes further comprise a software code for determining the similarity between the first facial region and a second facial region by comparing a first name of the first facial region with a second name of the second facial region.

25. The electronic device of claim 19, wherein the software code for grouping the facial regions into a plurality of clusters of faces is assigning the first facial region and a second facial region to the same cluster of faces when the first facial region is similar to the second facial region.

26. The electronic device of claim 25, wherein the second facial region is generated by averaging facial regions grouped in a first cluster of faces.

27. The electronic device of claim 19, wherein the software codes further comprise a software code for modifying the facial regions.

28. The electronic device of claim 27, wherein the processor executes software code for modifying the facial regions when the first facial region is generated from a first image and the first image is located in an album currently browsed in the browser window.

29. The electronic device of claim 27, wherein the processor executes software code for modifying the facial regions when the first facial region is generated from a first image and the first image is not located in an album currently browsed in the browser window.

30. The electronic device of claim 27, wherein the software code for modifying the facial regions comprises at least one of:
a code for changing a background color of the facial regions;
a code for adding an underline under the facial regions; and
a code for adding a colored frame surrounding the facial regions.

31. A method of browsing images grouped by person on a photo displaying system having a processor, the method comprising:
generating, using the processor, a plurality of facial regions from a plurality of images of a plurality of albums;
grouping, using the processor, the facial regions into a plurality of clusters of faces based on similarity between the facial regions;
associating, using the processor, the clusters of faces with at least two of the albums based on the facial regions;
displaying, using the processor, images of a specific album and facial regions of the clusters of faces associated with the specific album, wherein the step of displaying further comprises:
displaying a browser window at least including a photo frame and a people frame;
displaying all images of the specific album in the photo frame of the browser window; and
displaying the facial regions of the clusters of faces associated with the specific album in the people frame of the browser window;
wherein the browser window, the photo frame and the people frame are displayed at the same time;
receiving a signal to select one of the facial regions of the displayed clusters of faces; and
updating, using the processor, the photo frame and the people frame if the selected facial region corresponds to another specific album of the associated albums.

* * * * *